(12) United States Patent
Niessner

(10) Patent No.: US 10,892,605 B2
(45) Date of Patent: Jan. 12, 2021

(54) SPARK PLUG

(71) Applicant: Federal-Mogul Ignition GmbH, Neuhaus-Schierschnitz (DE)

(72) Inventor: Werner Niessner, Steinheim (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 0 days.

(21) Appl. No.: 16/703,512

(22) Filed: Dec. 4, 2019

(65) Prior Publication Data

US 2020/0182132 A1      Jun. 11, 2020

Related U.S. Application Data

(60) Provisional application No. 62/776,218, filed on Dec. 6, 2018.

(51) Int. Cl.
| | |
|---|---|
| *H01T 13/52* | (2006.01) |
| *F02B 19/18* | (2006.01) |
| *F02B 19/12* | (2006.01) |
| *H01T 13/02* | (2006.01) |
| *H01T 13/54* | (2006.01) |
| *H01T 13/34* | (2006.01) |

(52) U.S. Cl.
CPC .............. *H01T 13/52* (2013.01); *F02B 19/12* (2013.01); *F02B 19/18* (2013.01); *H01T 13/02* (2013.01); *H01T 13/34* (2013.01); *H01T 13/54* (2013.01)

(58) Field of Classification Search
CPC .......... F02B 19/12; F02B 19/18; H01T 13/02; H01T 13/34; H01T 13/52; H01T 13/54

USPC ........................................................ 123/260
See application file for complete search history.

(56) References Cited

U.S. PATENT DOCUMENTS

| 2,874,208 | A | * | 2/1959 | Pierce | ..................... | H01T 13/52 |
|---|---|---|---|---|---|---|
| | | | | | | 174/152 S |
| 2,899,585 | A | * | 8/1959 | Dollenberg | ............. | H01T 13/52 |
| | | | | | | 313/143 |
| 3,202,859 | A | * | 8/1965 | Knaggs | ................... | H01T 13/52 |
| | | | | | | 313/130 |
| 3,558,959 | A | * | 1/1971 | Ziemendorf | ............. | H01B 1/18 |
| | | | | | | 313/130 |
| 4,695,758 | A | | 9/1987 | Nishida et al. | | |
| 4,798,991 | A | | 1/1989 | Benedikt et al. | | |
| 5,731,655 | A | | 3/1998 | Corrado | | |
| 8,191,530 | B2 | | 6/2012 | Gruber et al. | | |
| 2011/0148274 | A1 | * | 6/2011 | Ernst | ..................... | H01T 13/467 |
| | | | | | | 313/141 |

(Continued)

FOREIGN PATENT DOCUMENTS

| EP | 1701419 A1 | 9/2006 | | |
|---|---|---|---|---|
| GB | 2149852 A | * | 6/1985 | ............. F02P 9/007 |

(Continued)

*Primary Examiner* — Mahmoud Gimie
(74) *Attorney, Agent, or Firm* — Reising Ethington, P.C.

(57) ABSTRACT

A spark plug for generating an axially extending surface spark between a sparking tip of the center electrode and a seal supporting sparking projection located at an internal step portion of the metal shell. In one embodiment, the spark plug is a pre-chamber spark plug having a pre-chamber cap attached to a distal end of the metal shell. The spark plug can allow for unobstructed flame propagation through the pre-chamber, without having the flame obstructed by narrow gaps or a separate ground electrode.

19 Claims, 1 Drawing Sheet

(56) References Cited

U.S. PATENT DOCUMENTS

| | | |
|---|---|---|
| 2014/0102404 A1 | 4/2014 | Sotiropoulou et al. |
| 2014/0261296 A1 | 9/2014 | Sotiropoulou et al. |
| 2015/0114332 A1 | 4/2015 | Stifel et al. |

FOREIGN PATENT DOCUMENTS

| | | | |
|---|---|---|---|
| GB | 2318831 A * | 5/1998 | ............ H01T 13/52 |
| GB | 2361264 A | 10/2001 | |
| WO | 2016075358 A1 | 5/2016 | |
| WO | WO-2018181654 A1 * | 10/2018 | ............ H01T 13/20 |

* cited by examiner

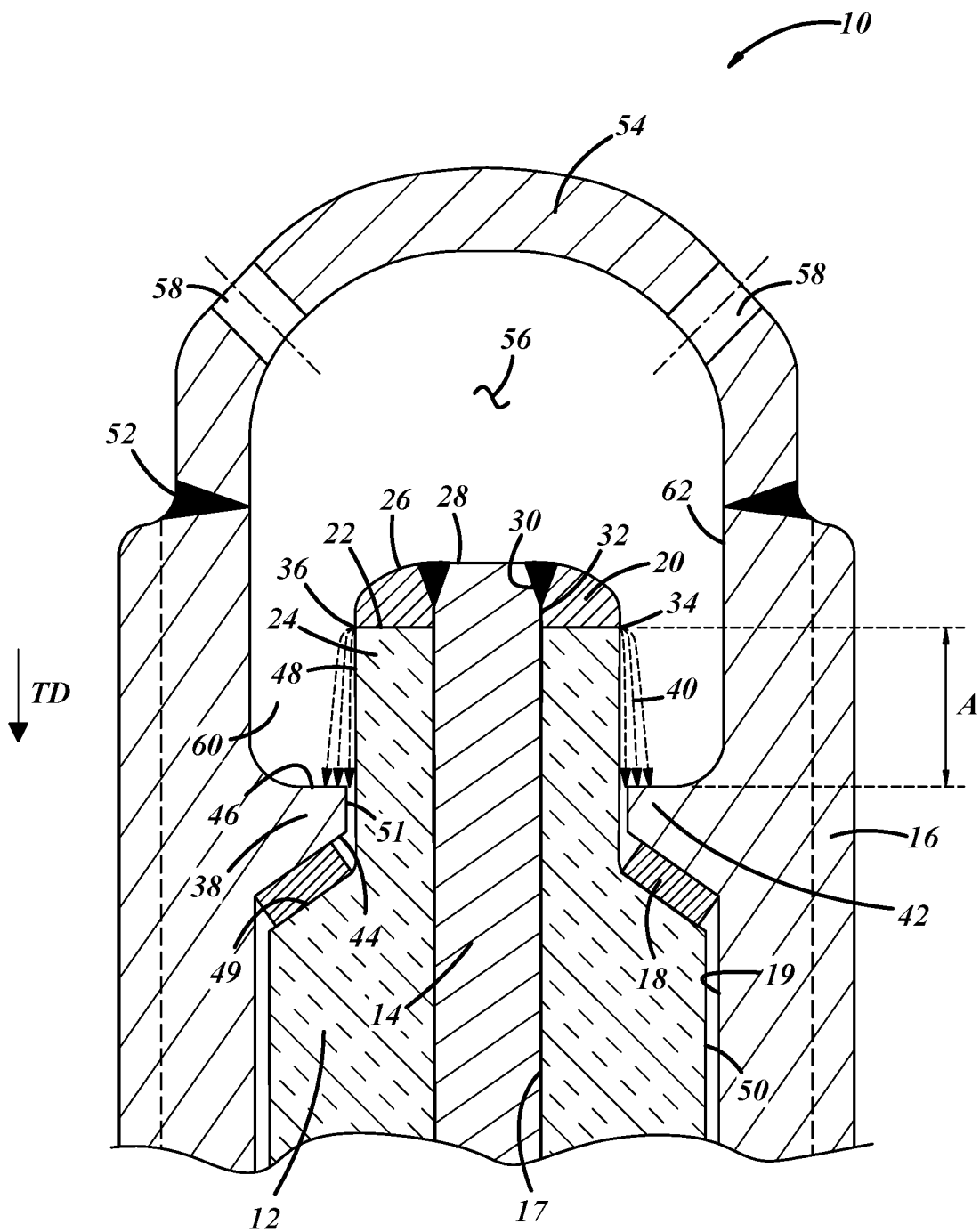

SPARK PLUG

RELATED APPLICATIONS

This application claims the benefit of U.S. Provisional Application No. 62/776,218, filed Dec. 6, 2018, the entire contents of which are herein incorporated by reference.

FIELD

This invention generally relates to spark plugs, and more particularly, to pre-chamber spark plugs.

BACKGROUND

Pre-chamber spark plug function in gasoline-driven engines depends on the inlet of unburnt gas and the flushing out of residual gas after combustion. In particular, flushing the burnt gas out of the pre-chamber of a passive pre-chamber spark plug has an effect on the thermal suitability of the spark plug. Incomplete flushing out of residual gas can result in irregular combustions caused by pre-inflammations in the pre-chamber of the spark plug. Pre-inflammations in the pre-chamber of the spark plug not only increase the temperatures of the various spark plug components such as the ground electrode, the center electrode, the insulator base, or the pre-chamber cap, but can also lead to pre-inflammations in the main combustion chamber.

SUMMARY

According to one embodiment, there is provided a spark plug comprising: a metal shell having an axial bore and a seal supporting sparking projection at an internal step portion; an insulator having an axial bore and being disposed at least partially within the axial bore of the metal shell; a center electrode being disposed at least partially within the axial bore of the insulator; and a sparking tip attached to the center electrode. The sparking tip forms a spark gap with the seal supporting sparking projection at the internal step portion of the shell.

According to various embodiments, the spark plug may further include any one of the following features or any technically-feasible combination of some or all of these features:

- the sparking tip is a sparking ring located directly adjacent to a core nose end of the insulator and attached at a distal end of the center electrode;
- the sparking ring is configured to generate a spark at an interface edge between the sparking ring and the core nose end of the insulator;
- the sparking ring covers an entire surface of the core nose end of the insulator so that the interface edge creates a flush boundary between the sparking ring and the core nose end of the insulator;
- the internal step portion includes an inner seal seat that seats a conical seal ring between the inner seal seat and the insulator;
- a continuous columnar spark guide surface is provided along an outer diameter of the insulator;
- the spark guide surface is configured so that a spark runs axially in a terminal direction from the sparking tip to the shell along the continuous columnar spark guide surface;
- a pre-chamber cap having one or more orifices, wherein the pre-chamber cap is attached to a distal end of the metal shell to form a pre-chamber;

and/or
- the pre-chamber is configured such that unburnt gas flows without being obstructed from a separate ground electrode.

According to another embodiment, there is provided a spark plug comprising: a metal shell having an axial bore; an insulator having an outer diameter and an axial bore, the insulator being disposed at least partially within the axial bore of the metal shell; and a center electrode being disposed at least partially within the axial bore of the insulator. The spark plug is configured so that a spark travels axially in a terminal direction from the center electrode to the metal shell along a continuous columnar spark guide surface provided along the outer diameter of the insulator.

According to various embodiments, the spark plug may further include any one of the following features or any technically-feasible combination of some or all of these features:

- the center electrode includes a sparking tip attached such that the sparking tip is situated directly adjacent to a core nose end of the insulator;
- the sparking tip is configured so that the spark is generated at an interface edge between the sparking tip and the core nose end of the insulator;
- the sparking tip forms a spark gap with a seal supporting sparking projection at an internal step portion of the shell;
- the internal step portion includes an inner seal seat that seats a conical seal ring between the inner seal seat and the insulator; and/or
- a pre-chamber cap having one or more orifices, wherein the pre-chamber cap is attached to a distal end of the metal shell to form a pre-chamber.

According to another embodiment, there is provided a method of operating a spark plug, the spark plug comprising a metal shell having an axial bore, an insulator having an axial bore and being disposed at least partially within the axial bore of the metal shell, a center electrode being disposed at least partially within the axial bore of the insulator, and a sparking tip attached to the center electrode. The method comprises the step of: generating a spark that extends along an outer diameter of the insulator between the sparking tip and an internal step portion of the metal shell in response to a voltage being applied to the center electrode.

According to various embodiments, the method may further include any one of the following features or steps or any technically-feasible combination of some or all of these features or steps:

- the spark is a surface spark that extends axially;
- the surface spark travels in a terminal direction away from a core nose end of the insulator;
- propagating a flame out of one or more orifices in a pre-chamber cap attached to the metal shell; and/or
- the flame is unobstructed by a separate ground electrode.

DRAWING

One or more embodiments will hereinafter be described in conjunction with the appended FIGURE, wherein like designations denote like elements, and wherein the FIGURE is a partial, cross-sectional view of a pre-chamber spark plug according to one embodiment.

DESCRIPTION

The spark plug described herein includes a sparking tip or sparking ring attached at a distal end of the center electrode so that it is located directly adjacent to the core nose end of the insulator. In accordance with one embodiment, the sparking ring is configured to form an axially extending surface spark from the sparking ring up towards an internal step in the shell, thereby eliminating the need for a ground electrode. This can create more volume in the pre-chamber for unobstructed flame propagation. Accordingly, there is provided a passive pre-chamber spark plug that allows for air-fuel-mixture in the pre-chamber to be safely ignited at all operating and load points. In doing so, the flames that are produced in the main combustion chamber of a gasoline driven engine are conducted so that the compressed air-fuel mixture can be safely inflamed. The unobstructed inlet and outlet to the spark gap, as well as the surface spark gap arrangement described herein, can provide these benefits, along with wider gaps between the pre-chamber wall and the insulator base.

In pre-chamber spark plug embodiments in particular, the arrangements described herein can be used efficiently in modern gasoline passenger car sized engines for the ignition of lean main combustion mixtures. This can reduce nitrous oxide emissions by lowering overall combustion temperatures. Moreover, the spark gap arrangement described herein can result in a faster combustion process and thus can help knock mitigation.

The FIGURE shows a pre-chamber spark plug 10 having a ceramic insulator 12 which envelops a center electrode 14, which can be incorporated in a gas-pressure-tight manner in a metal shell 16 with a conical seal ring 18. The conical seal ring 18 seals off the combustion chamber and/or pre-chamber to help prevent unwanted leakage. The center electrode 14 is located in an axial bore 17 of the insulator 12, and the insulator is located within an axial bore 19 of the shell 16. The distal end of the center electrode 14 has an attached sparking tip or ring 20 which covers the entire surface of the core nose end 22 of the insulator base 24. Other sparking tip configurations are certainly possible.

In the illustrated embodiment, the sparking ring 20 is sized to form a generally flush sparking end 26 at a distal end 28 of the center electrode 14. The sparking ring 20 can be made of any operable material, and preferably, is made from a precious metal such as platinum, iridium, or an alloy thereof. The sparking ring 20 is welded along its inner diameter 30 to an outer diameter 32 of the center electrode 14. A spark generation point 34 is formed between the core nose end 22 of the insulator base 24 and the interface edge 36 of the sparking ring 20. In some embodiments, the interface edge 36 creates a flush boundary between the sparking ring 20 and the core nose end 22 of the insulator 12.

The sparking ring 20 forms a gap A with a seal supporting sparking projection 38, which is an internal protrusion of the shell, such that a spark 40 can travel from the spark generation point 34 at the interface edge 36 of the sparking ring 20 to the seal supporting sparking projection 38. The seal supporting sparking projection 38 is an internal step or shoulder 42 having inner seal seat 44 and a sparking surface 46. Gap A is designed so that an electric field is formed when applying voltage and may be a surface discharge spark gap having an axial spark gap portion. When the flashover voltage is exceeded, an electric flashover is formed in gap A as a surface spark 40 forms axially in a terminal direction TD along a continuous columnar spark guide surface 48 formed along an outer diameter 50 of the insulator 12 (i.e., the spark 40 forms in the lengthwise direction with relation to the spark plug 10, as opposed to radially or radiating outward from a central longitudinal axis of the plug). Accordingly, the seal supporting sparking projection 38 serves as both an inner seal seat 44 for the conical seal ring 18, which seats the insulator 12, as well as a sparking surface 46 for the surface spark 40. The seal supporting sparking projection 38 is advantageously an integral portion of the metal shell 16, and in such an embodiment, is made of the same material as the shell (e.g., steel).

The continuous columnar spark guide surface 48 defines the surface gap A between the interface edge 36 of the sparking tip or ring 20 and the seal supporting sparking projection 38. Since a discharge over a surface requires a lower voltage, a longer spark 40 is possible. Further, having the spark location axially extend along the continuous columnar spark guide surface 48 results in a spark 40 location at an upper position inside the pre-chamber more remote from the orifices, which can be beneficial for flame propagation and subsequent pressure build-up in the pre-chamber. Further, the axially extending surface gap A can provide for better mixing of the residual gases in the core nose region. Since the window for flushing out the residual burnt gases after combustion is typically quite small (mainly during the expansion phase) some residual gases will always remain inside the pre-chamber. Thus, providing the spark 40 at the surface 48 further from the pre-chamber cap causes an ignitable mixture to transport more of the residual gases away from the pre-chamber. In the illustrated embodiment, the outer diameter of the insulator 12 at the continuous columnar spark guide surface 48 is the same as the outer diameter of the sparking ring 20 at the interface edge 36. This geometrical arrangement can help provide an unobstructed spark guide surface.

The seal supporting sparking projection 38 allows for the formation of a spark 40 that travels axially in a terminal direction TD toward a terminal end of the spark plug (opposite the distal end 52 of the shell). The seal supporting sparking projection 38 is an integral or contiguous portion of the shell 16 and can project from the axial bore 19 at a location remote from the distal end 52 of the shell 16 (e.g., spaced from the distal end 52 of the shell 16 by at least the distance of the spark gap A, or in some embodiments, a factor of 1.5-2 times the distance of A). The seal supporting sparking projection 38 is thus located at an internal step or shoulder 42 located in the axial bore 19 of the shell 16. This location allows for the seal supporting sparking projection 38 to act as a seal supporting surface to support the seal 18 between the inner seal seat 44 and the core nose transition point 49 at the fillet where the outer diameter 50 of the insulator 12 widens. A transition wall 51 is situated between the inner seal seat 44 and the sparking surface 46. The transition wall 51 separates the inner seal seat 44 and the sparking surface 46, and as shown in the FIGURE, the angles at which the inner seal seat 44 and the sparking surface 46 join the transition wall 51 are different.

A distal end 52 of the shell 16 is provided with a pre-chamber cap 54. The cap 54 is advantageously welded to the distal end 52 of the shell 16 to form a pre-chamber 56. The pre-chamber cap 54 is equipped with at least one orifice or drill hole 58 to ensure gas exchange to the main combustion chamber of the gasoline engine. Axial surface sparks in the pre-chamber 56 are formed between the sparking ring 20 and the sparking surface 46 of the seal supporting sparking projection 38. The illustrated configuration allows for a hollowed workspace 60 in the area of the seal supporting sparking projection 38 with gap dimensions that are comparable, for example, with M12 spark plugs (e.g., greater than 1.5 mm). Additionally, the sparking end 26 of the sparking ring 20 does not extend further than the distal end 52 of the shell 16 such that ample room is provided from the axially extending spark gap A out to the orifices or drill holes 58 of the pre-chamber cap 54. This can provide better flushing of the pre-chamber 56 during operation. Accordingly, the hollowed workspace 60 is formed between the continuous spark guide surface 48 and an inner recessed radius 62 of the metal shell 16. Flames can thus travel unobstructed from the hollowed workspace 60 out of the orifices 58 in the pre-chamber cap 54. In contrast with other spark plugs, such as those having a separately attached J-gap ground electrode or an annular ground electrode which may at least partially hinder or obstruct flame propagation, the spark plug 10 illustrated in the FIGURE can provide for more unobstructed flame propagation.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A spark plug, comprising:
   a metal shell having an axial bore and a seal supporting sparking projection at an internal step portion, the seal supporting sparking projection has an inner seal seat on one side and a sparking surface on another side;
   an insulator having an axial bore and being disposed at least partially within the axial bore of the metal shell such that the insulator is seated at the inner seal seat of the seal supporting sparking projection;
   a center electrode being disposed at least partially within the axial bore of the insulator; and
   a sparking tip attached to the center electrode, wherein the sparking tip forms a spark gap with the sparking surface of the seal supporting sparking projection.

2. The spark plug of claim 1, wherein the sparking tip is a sparking ring located directly adjacent to a core nose end of the insulator and attached at a distal end of the center electrode.

3. The spark plug of claim 2, wherein the sparking ring is configured to generate a spark at an interface edge between the sparking ring and the core nose end of the insulator.

4. The spark plug of claim 3, wherein the sparking ring covers an entire surface of the core nose end of the insulator so that the interface edge creates a flush boundary between the sparking ring and the core nose end of the insulator.

5. The spark plug of claim 1, wherein the inner seal seat seats a conical seal ring between the inner seal seat and the insulator.

6. The spark plug of claim 1, wherein a continuous columnar spark guide surface is provided along an outer diameter of the insulator.

7. The spark plug of claim 6, wherein the spark guide surface is configured so that a spark runs axially in a terminal direction from the sparking tip to the shell along the continuous columnar spark guide surface.

8. The spark plug of claim 1, further comprising a pre-chamber cap having one or more orifices, wherein the pre-chamber cap is attached to a distal end of the metal shell to form a pre-chamber.

9. The spark plug of claim 8, wherein the pre-chamber is configured such that unburnt gas flows without being obstructed by a separate ground electrode.

10. A spark plug, comprising:
    a metal shell having an axial bore;
    an insulator having an outer diameter and an axial bore, the insulator being disposed at least partially within the axial bore of the metal shell; and
    a center electrode being disposed at least partially within the axial bore of the insulator, the center electrode includes a sparking tip welded thereto such that the sparking tip is situated directly adjacent to a core nose end of the insulator,
    wherein the spark plug is configured so that a spark travels axially in a terminal direction from the center electrode to the metal shell along a continuous columnar spark guide surface provided along the outer diameter of the insulator.

11. The spark plug of claim 10, wherein the sparking tip is configured so that the spark is generated at an interface edge between the sparking tip and the core nose end of the insulator.

12. The spark plug of claim 11, wherein the sparking tip forms a spark gap with a seal supporting sparking projection at an internal step portion of the shell.

13. The spark plug of claim 12, wherein the internal step portion includes an inner seal seat that seats a conical seal ring between the inner seal seat and the insulator.

14. The spark plug of claim 10, further comprising a pre-chamber cap having one or more orifices, wherein the pre-chamber cap is attached to a distal end of the metal shell to form a pre-chamber.

15. A method of operating a spark plug, the spark plug comprising a metal shell having an axial bore, an insulator having an axial bore and being disposed at least partially within the axial bore of the metal shell, a center electrode being disposed at least partially within the axial bore of the insulator, and a sparking tip attached to the center electrode such that the sparking tip is situated directly adjacent to a core nose end of the insulator, the method comprising the step of:
    generating a spark that extends along an outer diameter of the insulator between the sparking tip and an internal step portion of the metal shell in response to a voltage being applied to the center electrode.

16. The method of claim 15, wherein the spark is a surface spark that extends axially.

17. The method of claim 16, wherein the surface spark travels in a terminal direction away from a core nose end of the insulator.

18. The method of claim 15, further comprising the step of propagating a flame out of one or more orifices in a pre-chamber cap attached to the metal shell.

19. The method of claim 18, wherein the flame is unobstructed by a separate ground electrode.

\* \* \* \* \*